United States Patent [19]

Sanders et al.

[11] 3,909,585

[45] Sept. 30, 1975

[54] ARC WELDING TORCH

[75] Inventors: Harold D. Sanders; Thomas C. Landreth, both of Houston, Tex.

[73] Assignee: Central Welding Supply Co., S. Houston, Tex.

[22] Filed: May 13, 1974

[21] Appl. No.: 469,470

[52] U.S. Cl. .............................. 219/130; 138/120
[51] Int. Cl.² ..................... B23K 9/16; F16L 11/00
[58] Field of Search ...................... 138/120; 219/130

[56] References Cited
UNITED STATES PATENTS

| | | | |
|---|---|---|---|
| 395,671 | 1/1889 | Thayer | 138/120 X |
| 809,977 | 1/1906 | O'Brien | 138/120 |
| 2,817,749 | 12/1957 | Flood et al. | 219/130 |
| 3,197,611 | 7/1965 | Morris et al. | 219/130 |
| 3,703,622 | 11/1972 | Kleppen | 219/130 X |

FOREIGN PATENTS OR APPLICATIONS

| | | | |
|---|---|---|---|
| 101,158 | 3/1941 | Sweden | 138/120 |

*Primary Examiner*—C. L. Albritton
*Assistant Examiner*—N. D. Herkamp
*Attorney, Agent, or Firm*—Arnold, White & Durkee

[57] ABSTRACT

An improved arc welding torch is provided wherein the welding torch comprises in combination a body portion having at one end an inlet for the introduction of inert gas; a head portion attached to the body portion at the end remote from the inlet for the introduction of inert gas and having at the opposite end an outlet for the discharge of inert gas, the head portion being in electrical contact with the body portion; a first conduit through the body portion for passage of the inert gas therethrough and a second conduit in the head portion for the passage of inert gas therethrough, the first and second conduits being in fluid communication; means for passing electric current through the body portion and head portion; and electrode means in electrical contact with the head portion, the improvement wherein the body portion includes a plurality of co-axial ball and socket joints and means associated with the same to maintain the ball and socket joints in any configuration to which the plurality of co-axial ball and socket joints are deformed. This allows the arc welding torch, and the electrode in particular to have access to portions of the workpiece which would be normally inaccessible.

16 Claims, 7 Drawing Figures

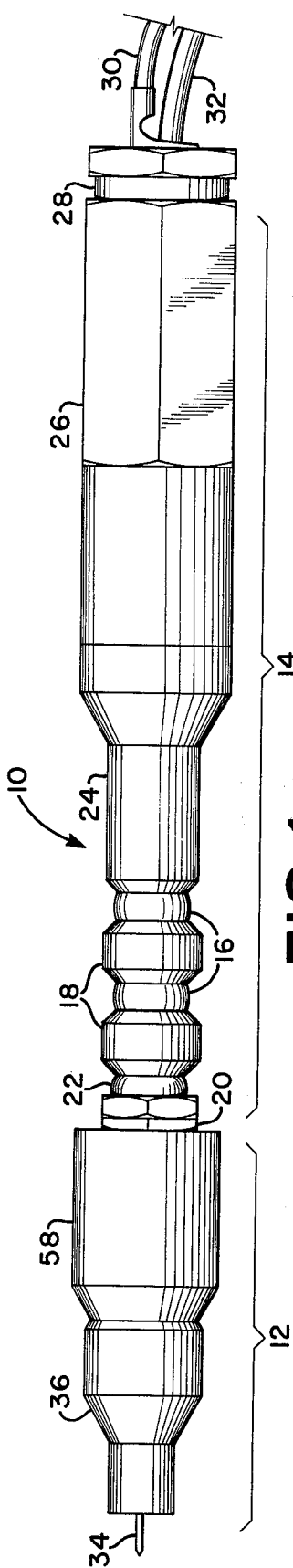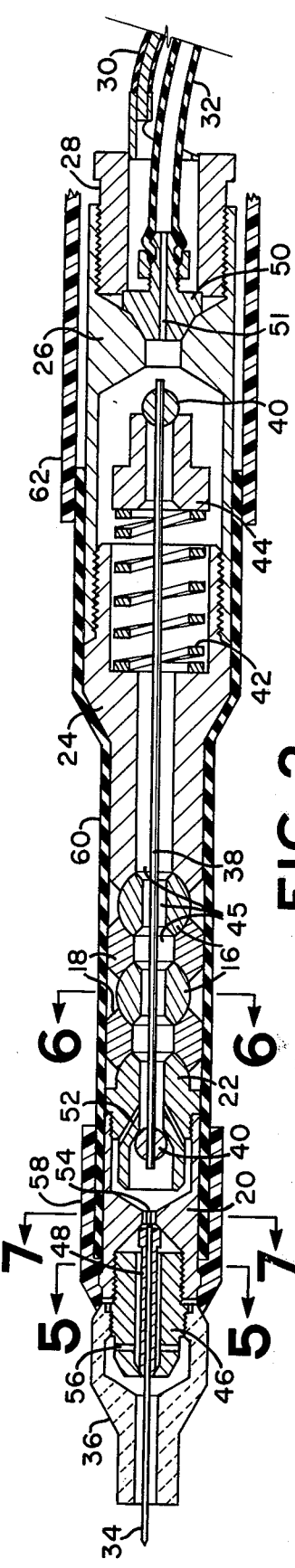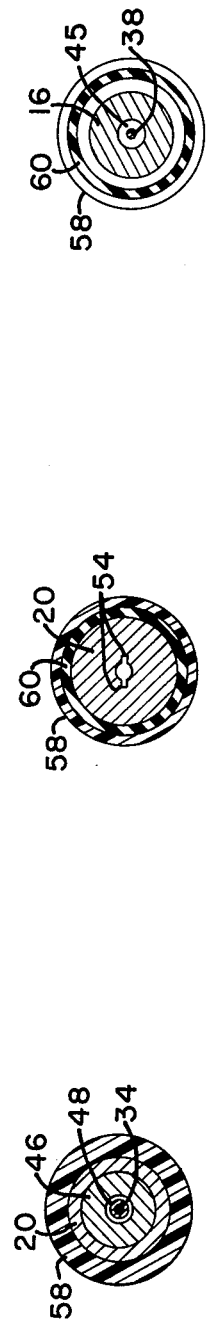

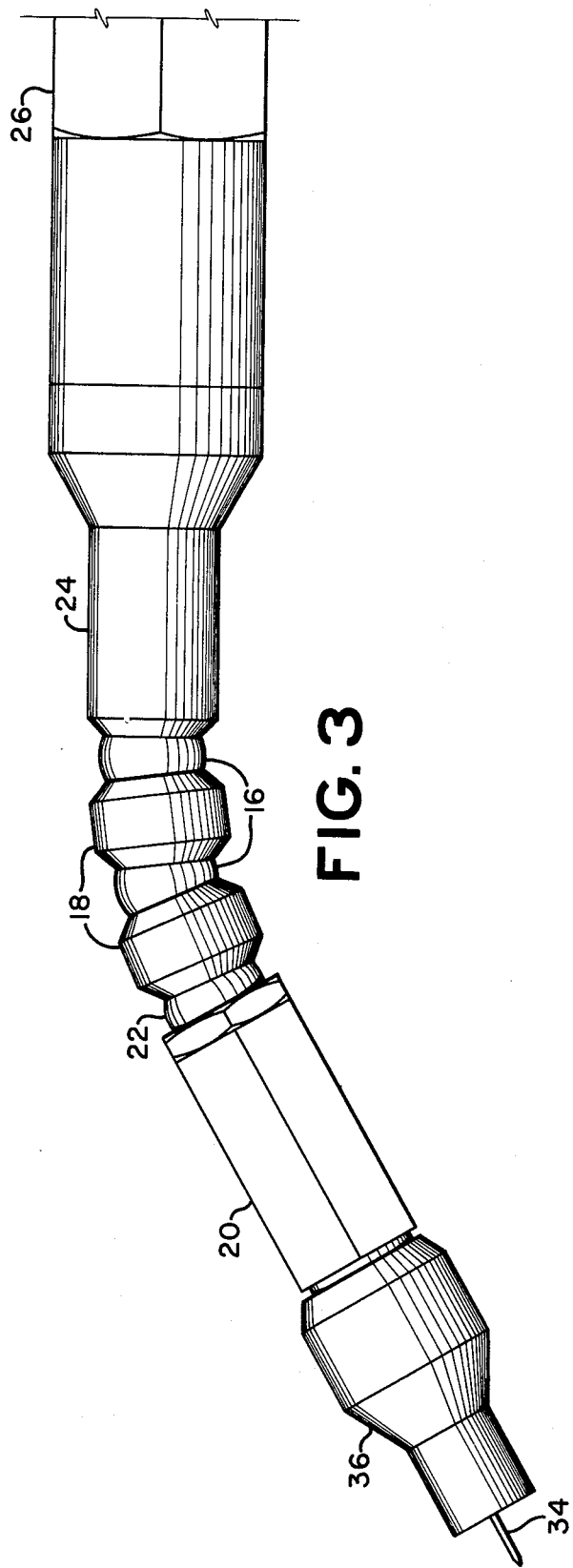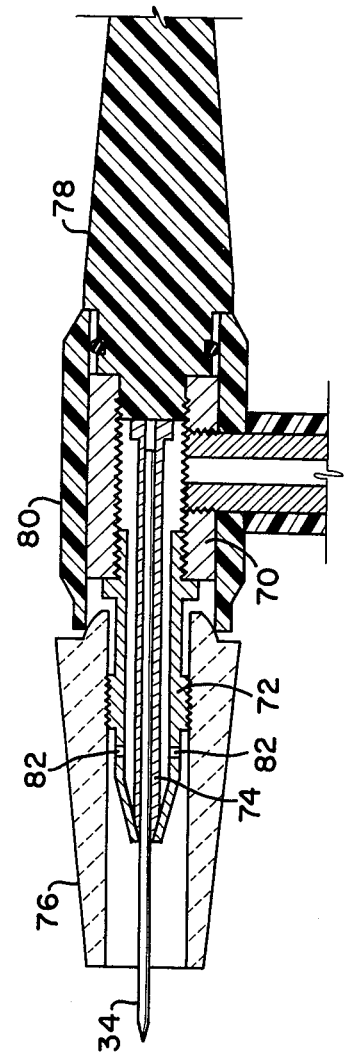

ARC WELDING TORCH

BACKGROUND OF THE INVENTION

1. Field of the Invention

The present invention is directed to an improvement in arc welding torches having an internal conduit for the passage of an inert gas; more particularly, the present invention is directed to an improved welding tordh for use in heliarc welding, wherein the improvement resides in the employment of a plurality of co-axial ball and socket joints, allowing the body portion of the torch to be flexed, thereby allowing the head of the torch to be positioned in an unlimited number of angles and directions in relationship to the torch body.

2. Description of the Prior Art

Prior known welding torches have been those in which the nozzle or head unit is rigidly secured at a fixed angle to the handle or body of the torch. Accordingly, when operating with such conventional torch, it is often difficult to carry out the necessary welding operation when access to the workpiece is obstructed by other components or when access to the workpiece is obstructed by reason of the particular shape of the workpiece. To overcome this problem, it has previously been thought necessary to have a plurality of torches, each with the head or nozzle at a different angle to the handle or body of the welding torch so as to always have at least one torch which can be utilized where accessibility to the workpiece is somewhat obstructed.

One attempt to eliminate these disadvantages of conventional welding torches is illustrated in U.S. Pat. No. 2,797,301 to Francis William Koppelstone, issued June 25, 1957 This patent discloses a welding torch which comprises a body portion, a nozzle unit, and clamping means for mounting the nozzle unit upon the body portion, the body portion and nozzle unit each having an internal conduit for the passage of gas and an annular sealing surface inclined at an acute angle to the longitudinal axis of the body portion and nozzle unit, respectively, the two annular sealing surfaces cooperating to provide a gas-tight joint between the two conduits, with the two annular surfaces being angularly adjustable to preset the angle of the longitudinal axis of the nozzle unit relative to the body unit. In effect, this patent discloses a welding torch in which there is a single ball and socket connecting the head portion to the body portion of the welding torch, so as to provide some angular movement of the head.

While the use of a single ball and socket joint connecting the head or nozzle with the body portion of the welding torch as in the above patent does produce some improvement over the conventional torch in which the nozzle or head is rigidly secured at a fixed angle to the handle or body, the degree of improvement is not appreciable in that the single ball and socket joint does not provide movement of the head or nozzle in all directions in relation to the body portion of the welding torch and the device such as illustrated in the above noted patent does not provide any means for insuring that angular direction of the head or nozzle portion remains fixed after movement relative to the body or handle portion of the welding torch. Without this, after movement a number of times, the head will no longer hold a fixed angle relative to the body. Accordingly, due to these drawbacks, a welding torch such as illustrated in the above noted patent has not been commercially accepted, and to date, there has been no commercially acceptable welding torch which completely eliminates the drawbacks and deficiencies of the conventional devices.

SUMMARY OF THE INVENTION

The present invention provides an improved welding torch, specifically, a welding torch useful in the heliarc welding process. The welding torch of the present invention is one which in general comprises the following components or elements in combination:

- a body portion having at one end an inlet for the introduction of inert gas;
- a head portion attached at one end to the end of the body portion opposite such inlet for the introduction of inert gas and having at its opposite end an outlet for the discharge of inert gas, the head portion and body portion being in electrical contact;
- a first conduit through the body portion for the passage of inert gas therethrough;
- a second conduit in the head portion for the passage of inert gas therethrough, the first conduit being in fluid communication with the second conduit;
- means for passing electric current through the body portion and head portion of the welding torch; and
- electrode means in electrical contact with the head portion.

The improvement in accordance with the present invention involves the use of a plurality of co-axial ball and socket joints in the body portion of the arc welding device, whereby the body portion can be moved in an unlimited number of directions so as to allow the head portion and electrode means to have access to normally inaccessible portions of a workpiece. The improved device further includes means for maintaining the ball and socket joints at any angle or in any direction to which the same are moved, such means preferably being a spring biased wire, maintaining the ball and socket joints under compression. The wire runs through the balls and sockets with sufficient gap to allow passage of the inert gas therethrough. Electrical contact is maintained between the balls and sockets.

Accordingly, it is a principle feature of the present invention to provide a novel welding torch, specifically adapted for the heliarc welding process, wherein the welding torch eliminates the disadvantages and drawbacks of conventional torches, allowing access to normally inaccessible portions of a workpiece.

It is a further feature of the present invention to provide such welding torch which comprises in combination a body portion and head portion in electrical contact and allowing an inert gas to flow therethrough, the body portion including a plurality of co-axial ball and socket joints which can be moved in an unlimited number of directions, thereby allowing the head portion access to normally inaccessible portions of a workpiece.

It is yet a further feature of the welding torch of the present invention to provide such welding torch having a body portion and head portion wherein the body portion includes a plurality of co-axial ball and socket joints and means associated therewith to maintain the co-axial balls and sockets under compression, whereby the balls and sockets can remain in a deformed state.

It is yet a further feature of the present invention to provide such welding torch, specifically adapted for the heliarc welding process, wherein the means maintaining the balls and sockets in a state of compression is a spring tensioned wire.

Still further features and advantages of the novel welding torch of the present invention will become more apparent from the following more detailed description thereof in association with the accompanying drawings.

IN THE DRAWINGS

In the drawings, in which the like numerals represent like elements throughout and which represent preferred non-limiting embodiments of the present invention:

FIG. 1 is a pictorial view of the welding torch of the present invention, absent protective shielding;

FIG. 2 is a cross-sectional view of the welding torch of FIG. 1, including protective shielding;

FIG. 3 is a further pictorial view of the welding torch of the present invention showing the co-axial balls and sockets in a deformed, non-straight line position;

FIG. 4 is a cross-sectional view of an optional 90° head useful in the welding torch of the present invention;

FIG. 5 is a cross-sectional view of the head portion of the welding torch of the present invention taken along line 5—5 of FIG. 2;

FIG. 6 is a cross-sectional view of the co-axial balls and sockets of the welding torch of the present invention taken along line 6—6 of FIG. 2; and FIG. 7 is a further cross-sectional view of the welding torch of the present invention taken along lines 7—7 of FIG. 2.

DESCRIPTION OF PREFERRED EMBODIMENTS

The welding torch of the present invention is one which is particularly applicable as a heliarc welding torch, which includes an electrode for establishing an electric arc between the torch and the nozzle or head to direct a stream of argon gas around the electric arc. To achieve these purposes, the arc welding torch must be capable of providing electrical connection from an initial source of current through the electrode. Moreover, the welding torch must be constructed such that conduits or channels are provided through the torch so as to allow the argon or similar inert gas to flow completely therethrough from an initial source of argon or inert gas through the head or nozzle section from which it is directed around the electric arc. These features common to all conventional welding torches of the type embraced by the present invention are achieved together with the further characteristic feature which allows the body portion, through a plurality of co-axial ball and socket joints, to be moved and deformed into an unlimited number of angles and directions, whereby the head or nozzle of the torch finds access to portions of a workpiece normally inaccessible. As will be appreciated from the more detailed description which follows, the above advantages of the present invention are achieved through the employment of a plurality of co-axial ball and socket joints in combination with means to maintain such co-axial ball and socket joints in compression so that the ball and socket joints maintain a deformed condition.

Referring to the drawings, FIG. 1 is a pictorial view of the welding torch of the present invention wherein the co-axial ball and socket joints are in a straight line, i.e., alined with the head or nozzle of the welding torch and body of the welding torch. This is distinguished from the illustration of FIG. 3 wherein the straight line condition of the co-axial ball and socket joints has been deformed and the head of the welding torch is now at an angle with respect to the body section thereof. The means to achieve this as well as the means to retain the co-axial ball and socket joints in their deformed condition, thereby allowing the head or nozzle of the welding torch to assume an unlimited number of angles with respect to the body section thereof, will be readily apparent from a more detailed description of FIG. 1–3.

Turning to FIG. 1, welding torch 10 is provided with a torch head section 12 and a torch body section 14. A portion of the torch body section 14 comprises a plurality of co-axial ball and socket joints, in this case illustrated as formed by two balls 16 and two sockets 18. A minimum of two co-axial ball and socket joints must be provided so as to create the necessary flexibility and the ability of the body portion 14 to be deformed in any direction so as to allow the head portion 12 of the arc welding tool 10 access to normally inaccessible portions of a workpiece.

The co-axial ball and socket joints formed by balls 16 and sockets 18 are connected to head 20 by means of head connector 22. At the opposite end the co-axial ball and socket joints are connected to spring holder 24, which in turn is attached to the butt 26 of the welding torch. If balls 16 and sockets 18 were not present, spring holder 24 and butt 26 would constitute the entire body section 14 of arc welding torch 10 and spring holder 24 would be attached directly to head connector 22 or head 20.

Beyond butt 26 is power cable fitting 28 through which the electrical power cable 30 and inert gas, i.e., argon hose 32 are connected to the body section 14 of the arc welding torch 10. While not shown in FIGS. 1–3, the inert gas hose 32 is connected to a suitable flow meter and to a suitable source of inert gas such as argon. In addition, while not shown in FIG. 1–3 the electrical power cable 30 is suitably connected to the power source of an arc welding machine.

An optional component of the arc welding torch of the present invention not illustrated in FIG. 1–3 is a valve to shut off the supply of inert gas where desired. Such valve can be suitably situated between butt 26 and power cable fitting 28. Such valve can be utilized to start and stop inert gas flow.

As seen in FIG. 1–3, the assembly at the end of head 20 of head section 12 of the welding torch includes an electrode 34, generally a tungsten electrode with a ceramic cover or cap 36 thereover. The attachment of the electrode 34 to head 20 is more clearly illustrated in FIG. 2. As will be further illustrated in connection with FIG. 2, electrical contact is made through the various portions of the welding torch from electrical cable 30 through the electrode 34. In addition, as will be illustrated in connection with FIG. 2, both the body section 14 and head section 12 of welding torch 10 contain a conduit therethrough so that the inert gas, such as argon, entering the welding torch via inert gas hose 32 passes through the entire torch forming a shield around the electric arc created by electrode 34. This is essentially the operation of the welding torch in a heliarc welding process.

The internal structure of the welding torch of the present invention can be seen by reference of FIG. 2 which illustrates the electrical contact between the various components and the passages or conduits for the passage of inert gas through the welding torch. Moreover, FIG. 2 clearly illustrates the co-axial ball and socket joints which provide for the movability and deformability of the body section of the welding torch and the means associated therewith to maintain such co-axial ball and socket joints in a deformed non-straight line condition.

Referring more specifically to FIG. 2, it is noted that in the embodiment illustrated each of balls 16 and sockets 18 includes a passageway through which passes wire 38. Accordingly as can be seen from FIG. 2, balls 16 and sockets 18 are co-axial with a continuous passageway therethrough, which passageway is continuous regardless of the direction in which the joints are deformed.

Referring again to FIG. 2, it is noted that wire crimps 40 are located at both ends of wire 38. Wire 38 is kept under tension, maintaining the balls 16 and the sockets 18 under compression by means of spring 42, associated spring cap 44 and head connector 22. This particular arrangement illustrated in FIG. 2 maintaining the balls 16 and sockets 18 under compression allows the co-axial ball and socket joints to retain any deformed position or direction to which the same are moved. This therefore allows the head section 12 to be at unlimited number of angles with respect to body section 14, whereby the head section and more specifically the electrode 34, is accessible to areas of the workpiece which might be otherwise inaccessible.

Referring again to FIG. 2, it is noted that one of the sockets 18 has a surface which mates with a surface of head connector 22, while one of the balls 16 has a surface which mates with spring holder 24. In effect, therefore, head connector 22 acts as a third ball and spring holder 24 acts as a third socket making in effect three joints, although the embodiment illustrated in FIG. 2 illustrates only two balls 16 and two sockets 18. While this is the minimum number of balls 16 and sockets 18 which can be utilized to produce the desired movability and flexibility in the body section 14 of the welding torch, additional balls 16 and sockets 18 can be utilized where desired to achieve even greater degrees of flexibility. Where such additional balls 16 and additional sockets 18 are utilized, such balls 16 and sockets 18 will be co-axial in the same manner as illustrated in FIG. 2. Moreover, as illustrated in FIG. 2 a gap 45 must exist between wire 38 and the internal surfaces of the balls 16 and sockets 18 so as to provide a passageway for the flow of inert gas through the welding torch. This will be explained in more detail in connection with the flow of inert gas.

Referring again to FIG. 2, spring holder 24 is externally threaded and is joined to internally threaded butt 26. The opposite end of butt 26 is also internally threaded and threaded therein is externally threaded power cable fitting 28. The electrical cable 30 is in direct electrical contact with power cable fitting 28 by means of an electrically conductive clip or any other suitable means. Power cable fitting 28 is in turn in electrical contact with butt 26 which is in turn in electrical contact with spring holder 24. All of these metal parts of the welding torch of the present invention as well as the remaining metal parts can be constructed of any electrically conductive metal, with brass being preferred.

Referring to the embodiment illustrated in FIG. 2, electrical contact is then made through balls 16 and sockets 18 and head connector 22 which are in sufficient metal to metal contact due to the compressive forces applied thereto by means of spring 42 and wire 38. As illustrated, head connector 22 is externally threaded and threaded thereon is internally threaded head 20. The particular head illustrated in FIG. 2 is a straight head. This is distinguishable from the 90° head to be discussed hereinafter in connection with FIG. 4.

The opposite end of head 20 is also internally threaded, with externally threaded collet body 46 being threaded therein. Collet body 46 supports collet 48, which in turn supports electrode 34. Ceramic cap or cover 36 is internally threaded and is threaded upon and attached to collet body 46. As seen in the embodiment of FIG. 2, electrode 34 extends beyond ceramic cover or cap 36.

Electrical contact is made between head 20 and collet body 46 and collet 48 which in turn are in electrical contact with electrode 34. Accordingly, the electrical current initially supplied from the arc welding machine through power cable 30 is transmitted through the electrical conducting components of the arc welding torch until the electrical current reaches electrode 36 from which an electric arc to the workpiece is produced. This achieves the desired welding function of the arc welding torch.

In accordance with the present invention, the inert gas such as argon, is supplied through a flow meter and subsequently through inert gas hose 32 into the interior of the welding torch 10. Inert gas hose 32 is connected to butt 26 and power cable 28 by means of nipple 50 having an aperture 51 therethrough, opening into the interior of butt 26. The inert gas, preferably argon flows through such passageway 51, around spring cap 44 and thereafter through the coils of spring 42. The inert gas then flows through the space between wire 38 and the walls of spring holder 24 and subsequently through passageway 45 between wire 38 and the interior walls of balls 16 and sockets 18. Head connector 22 is provided with two channels or passageways 52 through which the inert gas flows into the interior space of head 20. The inert gas then flows through slots 54 of collet 48. Such slots 54 of collet 48 can be more easily seen in FIG. 7, which the cross-sectional view along line 7—7 of FIG. 2.

The inert gas then flows in the annular space between collet 48 and collet body 46 entering the interior space of ceramic cap or cover 36 through channels or passageways 56 in collet body 46. The inert gas then flows out of the welding torch through the annular passageway of ceramic cover or cap 36. The inert gas thus provides a shielding gas around the electric arc formed between the workpiece and electrode 34.

In accordance with the embodiment illustrated in FIG. 2, behind ceramic cap or cover 36 is a plastic cover 58 (preferably Teflon) for purposes of further insulation. In addition, flexible rubber insulation 60 is provided as a cover over body section 14 of the welding torch 10. This insulation is preferably formed of a flexible rubber material so as to be capable of deforming when the co-axial ball and socket joints are deformed so as to provide for an angular relationship between head section 12 and body section 14 of the welding torch 10. A non-conductive handle 62 of plastic or similar material, can be provided over the remainder of the welding torch. Handle 62 is formed of a rigid material. Due to the deformable flexible nature of covering 60, both the plastic cover 58 over the ceramic cap or cover 36 and handle 62 can be retained in position by a simple pressure seal with flexible rubber cover 60.

An alternative embodiment is illustrated in FIG. 4, which shows the employment of a 90° head 70 in lieu of straight head 20. In the embodiment illustrated in FIG. 4, 90° head 70 is internally threaded, and threaded therein is collet body 72 which holds collet 74. An electrode 34 is retained in collet 74 in substantially the same manner as described previously in connection with FIG. 1 and 3.

As illustrated in the embodiment set forth in FIG. 4, a portion of collet body 72 is externally threaded and threaded thereon is ceramic cover 76. Also, threaded in a 90° head 70 is a back cap 78 having the effect of tightening the electrode assembly. The entire 90° head is covered by a suitable plastic covering, providing the necessary insulation.

In the embodiment illustrated in FIG. 4, electrical connection is made through head 70, collet body 72, collet 74 and finally electrode 34. This is the same as previously described in connection with the embodiment of FIG. 1 to 3. The inert gas flows through the 90° head and thereafter in the annular space between collet 74 and collet body 72. The inert gas then exits into the internal space of ceramic cover 76 through passageways or conduits 82 and subsequently exits the ceramic cover around electrode 34. In this way a shielding of inert gas if provided in the same manner as previously described in connection with the embodiment of FIGS. 1–3.

FIG. 5 is a cross-sectional diagram of the head, collet body and collet section of the arc welding torch 10 taken along line 5—5 of FIG. 2. The relationship of these parts as well as the conduit for the passage of inert gas can be clearly seen by reference to FIG. 5. FIG. 6 is a cross-sectional diagram taken along line 6—6 of FIG. 2, illustrating the co-axial ball and socket joints and again illustrating the space between wire 38 and the balls 16 and sockets 18. It is this spring loaded wire 38 which provides for the necessary compressive forces upon the co-axial ball and socket joints which allows them to retain any direction or angular displacement to which such ball and socket joints are displaced. Sufficient clearance is provided between such wire 38 and the internal surfaces of ball 16 and sockets 18, however, to allow passage of the inert gas therethrough.

Slots 54 in collet 48 can be clearly seen in FIG. 7. The inert gas flows through this slot in its passageway between collet 48 and collet body 46 and subsequently through passageway or channels 56. This is in connection with the embodiment illustrated in FIG. 1–3.

By the provision of the plurality of co-axial ball and socket joints in accordance with the present invention and through the provision of the means associated therewith to maintain the balls and sockets in compression, i.e., the spring tension wire, it is possible in accordance with the present invention to provide an arc welding torch which eliminates the disadvantages and drawbacks of previously proposed products. The plurality of coaxial ball and socket joints allows the body portion of the arc welding torch to be flexed into an unlimited number of positions and to maintain such positions, thereby providing for an unlimited number of angular arrangements between the head section and body section of the arc welding torch. This therefore allows the head of the arc welding torch, and the electrode in particular, to have access to portions of the workpiece which would normally be inaccessible.

While the present invention has been described primarily with regard to the foregoing specific exemplification, it should be understood that the present invention cannot under any circumstances be deemed limited thereto but, rather, must be construed as broadly as any and all equivalents thereof.

What is claimed is:

1. In a welding torch comprising in combination:
   a body portion having at one end an inlet for the introduction of inert gas;
   a head portion attached at one end to the end of said body portion remote said inlet for the introduction of inert gas and having at the opposite end an outlet for the discharge of inert gas, said head portion being in electrical contact with said body portion;
   a first conduit through said body portion for passage of inert gas therethrough;
   a second conduit in said head portion for the passage of inert gas therethrough, said first conduit being in fluid communication with said second conduit;
   means for passing electric current through said body portion and said head portion; and
   electrode means in electrical contact with said head portion;
   the improvement wherein said body portion includes a plurality of co-axial ball and socket joints and means associated with said plurality of co-axial ball and socket joints comprising a spring tensioned wire passing through and maintaining said ball and socket joints under compressive forces, the spring being axially aligned with said ball and socket joints, to maintain said ball and socket joints in any configuration to which said plurality of co-axial ball and socket joints are deformed.

2. The welding torch of claim 1, wherein said plurality of co-axial ball and socket joints includes two balls and two sockets.

3. The welding torch of claim 1, further including sufficient clearance between said wire passing through said co-axial ball and socket joints and the balls and sockets to allow passage of an inert gas therethrough.

4. The welding torch of claim 1, wherein said spring tensioned wire further includes crimp means at opposite ends of said wire and means retaining said crimps means from axial movement in said welding torch.

5. The welding torch of claim 1, further including collet means to retain said electrode in said head portion.

6. The welding torch of claim 1, further including an insulating cover over at least a portion of said head portion, said electrode extending beyond said cover.

7. The welding torch of claim 1, further including an insulating cover over at least a part of said body portion.

8. The welding torch of claim 7, wherein the insulating cover over at least a part of said body portion is flexible.

9. The welding torch of claim 1, wherein said head portion includes a section at an angle of 90° to said body section and said electrode is positioned in said section.

10. A welding torch comprising:

a head portion having a first conduit for passage of inert gas therethrough;

a body portion having a second conduit therethrough, said first and second conduits being in fluid communication one with the other;

a plurality of ball and socket joints at one end of said body portion, said ball and socket joints being adjacent said head portion and co-axial with said head and body portions;

a spring tensioned wire passing through said ball and socket joints holding said ball and socket joints in compression for maintaining electrical continuity and fluid communication integrity through a central co-axial passage of said ball and socket joints;

a passage through the length of said welding torch including said first and second conduits, said passage suitable for passing inert gas therethrough in sufficient volume to provide a gas shield around an electrode at the exit end of said head portion; and an electrode means in electrical contact with said head portion.

11. The welding torch of claim 10, wherein said plurality of co-axial ball and socket joints includes two balls and two sockets.

12. The welding torch of claim 10, wherein said spring tensioned wire further includes crimp means at opposite ends of said wire and means retaining said crimp means from axial movement in said welding torch.

13. The welding torch of claim 10, further including an insulating cover over at least a portion of said head portion, said insulating cover for preventing an electrical path between said head portion and an object in contact with said head portion, said electrode extending from said head portion and beyond said insulating cover.

14. The welding torch of claim 10, further including an insulating cover over at least a part of said body portion.

15. The welding torch of claim 14, wherein the insulating cover over at least a part of said body portion is flexible for permitting said ball and socket joints to assume and retain a deformed position to which the same are moved.

16. The welding torch of claim 10, wherein said head portion includes a section at an angle of 90° to said body section and said electrode is positioned in said section.

* * * * *